Oct. 10, 1939.　　　　E. GLOWATZKI　　　　2,175,890

ELECTRICAL MEASURING SYSTEM

Filed Nov. 12, 1935

Inventor:
Ernst Glowatzki,
by Harry E. Dunham
His Attorney.

Patented Oct. 10, 1939

2,175,890

UNITED STATES PATENT OFFICE 2,175,890

ELECTRICAL MEASURING SYSTEM

Ernst Glowatzki, Berlin-Reinickendorf, Germany, assignor to General Electric Company, a corporation of New York Application November 12, 1935, Serial No. 49,394
In Germany December 18, 1934

3 Claims. (Cl. 171—95)

My invention relates to electrical instruments and amplifiers and concerns particularly a device for measuring alternating voltages.

It is an object of my invention to provide a highly sensitive device for measuring or amplifying alternating voltages of any frequency from zero to ultra high radio frequencies with an accuracy unimpaired by frequency variations.

Another object of my invention is to provide an arrangement imposing substantially no load on the circuit measured and consuming relatively little energy from an auxiliary source.

It is also an object of my invention to provide an arrangement permitting the use of direct-current instruments for measuring alternating currents or voltage without the necessity for using dry rectifiers.

Still another object of my invention is to provide a direct-current-fed arrangement for amplifying alternating voltages in which the alternating-current circuit shall be without disturbing effect on the direct-current circuit and vice versa.

Other and further objects and advantages will become apparent as the description proceeds.

In carrying out my invention in its preferred form, I utilize a three-element vacuum tube with a Wheatstone bridge in its plate circuit and with a voltage to be measured applied to the control grid of the tube. One or more of the arms of the Wheatstone bridge are composed of a material having a resistance varying with load.

Figure 1:
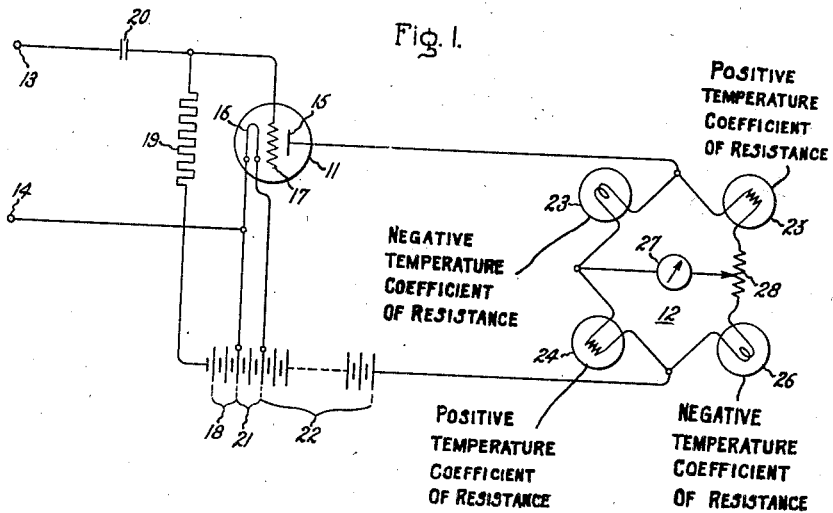
Figure 2:
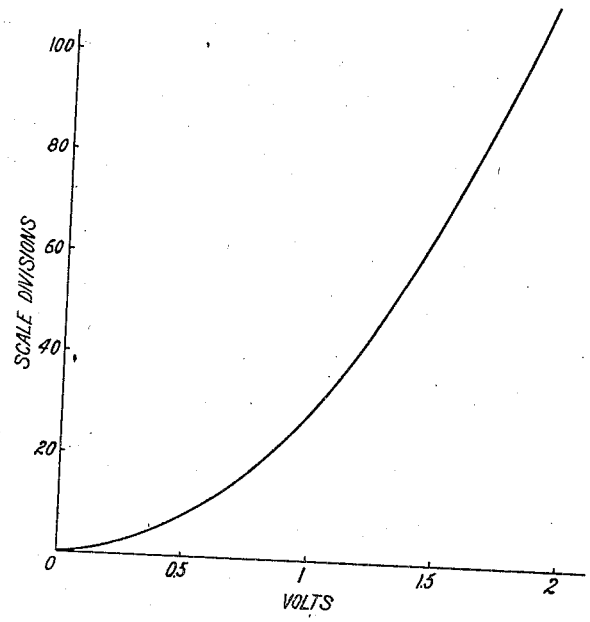

The invention will be understood more readily from the following detailed description when considered in connection with the accompanying drawing, and those features of the invention which are believed to be novel and patentable will be pointed out in the claims appended hereto. In the drawing, Fig. 1 is a schematic circuit diagram of one embodiment of the invention and Fig. 2 is a calibration curve of the apparatus of Fig. 1.

In the embodiment illustrated in the drawing, there is provided a three-element electric valve or discharge tube 11, having a Wheatstone bridge 12 connected in its plate circuit. Input terminals 13 and 14 of the apparatus are connected in the control electrode circuit of the tube 11 in the usual manner. The tube 11 is preferably of the vacuum type and contains an anode or plate 15, a cathode 16, and a control electrode or a grid 17. A grid-biasing battery 18 is preferably provided to bias the control electrode 17 negatively. The battery 18 may be connected in series with the cathode 16 and the control electrode 17 through a resistor 19. The terminals 13 and 14, to which the voltage to be measured is applied, are connected between the control electrode 17 and the cathode 16 with a condenser 20 in series. A source of current 21 is provided for heating the cathode 16, and a source of plate current 22 is connected between the cathode 16 and the anode 15 in series with the Wheatstone bridge 12.

The Wheatstone bridge 12 comprises a series pair of bridge arms 23 and 24 in parallel with another series pair of bridge arms 25 and 26. A current-responsive device 27 is connected in a cross circuit between the common terminal of the bridge arms 23 and 24 and a common terminal of the bridge arms 25 and 26. The current-responsive device 27 may take the form of an indicating electrical instrument, such as d'Arsonval galvanometer, for example, which is sensitive but responsive only to direct currents. To facilitate balancing the bridge 12, a low-resistance potentiometer 28 may be provided with portions on either side of its sliding tap included in bridge arms 25 and 26, respectively.

At least one of the bridge arms 23 to 26 includes or is composed of a material which varies in impedance in response to variations in current flowing therein. Preferably, to increase the effect, diagonally opposite bridge arms are composed of such a material. For example, the bridge arms 23 and 26 may comprise resistors which decrease in resistance as the current therein increases. For instance, the resistors 23 and 26 may be made of carbon or of a composition of carbon and silicon carbide, such as described in United States Patent No. 1,822,742 to McEachron. Instead of a material with a falling resistance characteristic for the variable impedance arm or arms, I may employ a material which increases in resistance with the current therein. Still greater response may be obtained by using both rising and falling resistance characteristic resistors and placing them in alternate bridge arms. For example, the bridge arms 23 and 26 may be carbon resistors, as mentioned, and the bridge arms 24 and 25 may be metallic resistors.

In case the bridge arms 23 to 26 are composed of a material which varies in resistance owing to temperature change caused by the heating effect of current therein, greater sensitivity will be obtained by enclosing the resistors constituting the bridge arms in vacuum receptacles in order to minimize the dissipation of heat and conserve the heat produced by current flow for raising the temperature of the resistor, and in order also to prevent disintegration of the resistor material, thus permitting the utilization of higher current densities and the obtaining of greater heating effects. For example, the bridge arms 23 and 26 may comprise carbon filament lamps and the bridge arms 24 and 25 may comprise tungsten filament lamps.

The elements of the apparatus are so chosen that the bridge 12 is balanced and the instrument 27 reads zero when no voltage is applied to the input terminals 13 and 14. Any required initial adjustments in the relative resistances of the bridge arms may be made by means of the potentiometer 28. A predetermined normal plate current, depending upon the characteristics of the tube 11 and the voltages of the current sources 18, 21, and 22, will flow through the tube 15 and divide between the branches of the bridge 12. However, owing to the fact that the bridge is balanced, no current will flow in the instrument 27.

When a voltage to be measured is applied to the input terminals 13 and 14, the voltage of the control grid will be varied and, consequently, the plate current will vary, as well as the branch currents in the bridge 12. Owing to the characteristics of the bridge arms, their resistance will vary as the currents in them vary and the bridge 12 will be unbalanced to an extent dependent upon the voltage at the terminals 13 and 14 and the variation in plate current produced thereby. The resulting reading of the instrument 27 provides a measure of the voltage applied to the input terminals 13 and 14.

Alternating voltages applied to the terminals 13 and 14 will cause an alternating current to be superimposed upon the normal plate current of the tube 11 but the average currents in the tube 11 and the bridge 12 will remain unchanged. Nevertheless, the alternating component of current in the bridge arms will have a heating effect varying their resistance and unbalancing the bridge to give a reading in the instrument 27 dependent upon the voltage applied to the terminals 13 and 14. At any frequency, including zero frequency or direct current, the voltages applied to the terminals 13 and 14 will cause a deflection of the instrument 27, varying substantially in proportion to the square of the applied voltage, owing to the fact that the bridge unbalance is caused by the heating effects of the current variations in the bridge arms. Since the circuit elements traversed by alternating current are free from reactance, variations in frequency are without effect on the measurement. Therefore, the same calibration curve of scale divisions against measured voltage, illustrated in Fig. 2, may be used for the apparatus regardless of frequency, down to and including zero frequency. It is evident that the direct currents produced in the circuits cannot have any effect in any other apparatus to which the terminals 13 and 14 may be connected and, likewise, that alternating currents do not enter into or cause any disturbance in the instrument 27.

It will be apparent that my measuring and amplifying arrangement is of great utility in a wide variety of applications, such as remote signaling, electro-acoustics, gauge indications, noise potential meters, sound impression meters, as well as radio broadcasting apparatus in which independence of frequency and minimum current consumption are of importance.

In accordance with the provisions of the patent statutes, I have described the principle of operation of my invention together with the apparatus which I now consider to represent the best embodiment thereof but I desire to have it understood that the apparatus is only illustrative and that the invention may be carried out by other means.

What I claim as new and desire to secure by Letters Patent of the United States, is:

1. A voltage-responsive apparatus comprising in combination, a discharge tube having an anode, a cathode, and a control electrode, two pairs of impedances connected in series-parallel as the arms of a Wheatstone bridge, a source of current connected in series with said Wheatstone bridge and said tube through its anode and cathode, and a current-responsive device connected in a cross circuit of said Wheatstone bridge, the voltage to be measured being applied between the cathode and control electrode of said tube, one of said bridge arms being composed of material tending to increase in impedance with increase in current therein and an adjacent bridge arm being composed of a material tending to decrease in impedance with increase in current therein.

2. A voltage-responsive apparatus comprising in combination, a discharge tube having an anode, a cathode, and a control electrode, two pairs of impedances connected in series-parallel as the arms of a Wheatstone bridge, a source of current connected in series with said Wheatstone bridge and said tube through its anode and cathode, and a current-responsive instrument connected in a cross circuit of said Wheatstone bridge, the voltage to be measured being applied between the cathode and control electrode of said tube, one of said bridge arms being composed of a material tending to vary in resistance with increase in current therein and being enclosed in a vacuum chamber.

3. A voltage-responsive apparatus comprising in combination, a discharge tube having an anode, a cathode, and a control electrode, two pairs of impedances connected in series-parallel as the arms of a Wheatstone bridge, a source of current connected in series with said Wheatstone bridge and said tube through its anode and cathode, and a current-responsive instrument connected in a cross circuit of said Wheatstone bridge, the voltage to be measured being applied between the cathode and control electrode of said tube, said bridge arms comprising alternately tungsten filament and carbon filament lamps.

ERNST GLOWATZKI.